United States Patent [19]
Bilak et al.

[11] Patent Number: 6,002,063
[45] Date of Patent: Dec. 14, 1999

[54] APPARATUS AND METHOD FOR SUBTERRANEAN INJECTION OF SLURRIED WASTES

[75] Inventors: Roman Anthony Bilak, Calgary; Leo Rothenburg, Waterloo; Maurice Dusseault, Conestogo, all of Canada

[73] Assignees: Terralog Technologies Inc., Calgary, Canada; Terralog Technologies U.S.A., Inc., Arcadian, Calif.

[21] Appl. No.: 09/094,622

[22] Filed: Jun. 15, 1998

Related U.S. Application Data

[63] Continuation-in-part of application No. 08/713,358, Sep. 13, 1996, abandoned.

[51] Int. Cl.$^6$ ........................................................ G21F 9/00
[52] U.S. Cl. ............................ 588/17; 588/3; 588/250; 588/252; 588/257; 588/259; 588/260
[58] Field of Search ................................ 588/3, 17, 250, 588/252, 257, 259, 260; 405/128; 166/250.01, 250.1, 250.07, 297, 298

[56] References Cited

U.S. PATENT DOCUMENTS

| | | | |
|---|---|---|---|
| 3,513,100 | 5/1970 | Stogner ........................................ | 588/3 |
| 4,271,696 | 6/1981 | Wood . | |
| 4,802,144 | 1/1989 | Holzhausen . | |
| 4,867,237 | 9/1989 | Wilson et al. . | |
| 4,973,194 | 11/1990 | Peterson ...................................... | 405/128 |
| 5,108,226 | 4/1992 | Jennings, Jr. ............................... | 405/128 |
| 5,133,624 | 7/1992 | Cahill .......................................... | 405/128 |
| 5,191,157 | 3/1993 | Crocker ....................................... | 588/250 |
| 5,226,749 | 7/1993 | Perkins ........................................ | 405/128 |
| 5,310,285 | 5/1994 | Northcott .................................... | 588/250 |
| 5,314,265 | 5/1994 | Perkins et al. .............................. | 405/128 |
| 5,318,382 | 6/1994 | Cahill .......................................... | 405/128 |
| 5,387,737 | 2/1995 | Schmidt et al. ............................ | 588/250 |
| 5,405,224 | 4/1995 | Aubert et al. ............................... | 405/128 |
| 5,463,164 | 10/1995 | Perkins ....................................... | 588/250 |
| 5,484,231 | 1/1996 | Cannan et al. ............................. | 405/128 |
| 5,489,740 | 2/1996 | Fletcher ...................................... | 588/250 |
| 5,536,115 | 7/1996 | Keck ........................................... | 405/128 |
| 5,551,976 | 9/1996 | Allen .......................................... | 588/250 |
| 5,589,603 | 12/1996 | Alexander et al. ........................ | 588/250 |
| 5,734,988 | 3/1998 | Alexander et al. ........................ | 588/250 |

OTHER PUBLICATIONS

Dussealt, "Slurry Fracture Injection" Hazardous Materials Management, Feb. 1995.
Dussealt, "Slurry Injection Disposal of Granular Solid Waste", Geoconfine, 1993.
Bruno et al., "Economic Disposal of Solid Oil Fill Waste through Slurry Fracture Injection", SPE 29646, Mar. 9, 1995.
Srinivasan et al., "Field Experiences with Oil Fill Waste Disposal through Slurry Fracture Injection", SPE 38254,Jun. 23, 1997.
Dusseault et al., "Disposal of Radioactive Wastes by Slurry Fracture Injection" Conference Paper, Sep. 1996.
Bruno et al., "Economic Disposal of Solid Oil Fill Wastes" E & P Exchange, Sep. 1995.

(List continued on next page.)

*Primary Examiner*—George Suchfield
*Attorney, Agent, or Firm*—McFadden, Fincham

[57] ABSTRACT

Injection of slurried wastes is carried out within deeply buried strata. Appropriate target strata are identified in terms of sufficient porosity and permeability, and overburden that includes permeable and impermeable strata. Slurry is injected at sufficient pressure to establish fracturing within the target strata. The injection pressures and the resulting waste pod are monitored by a suite of monitoring procedures, including bottomhole pressure and surface uplift. The injection is carried out in a series of injection episodes separated by interinjection episodes. Apparatus for preparing and injection the slurry include a mixing chamber, a partly encased well and a bottomhole pressure gauge. Process monitoring apparatus controls the operation of the system.

38 Claims, 5 Drawing Sheets

OTHER PUBLICATIONS

Dusseault et al., "Disposal of Granular Solid Wastes in the Western Canadian Sedementary Basin by Slurry Fracture Injection", from Deep Injection Disposal of Hazardous Waste, Academic Press, 1996.

J. Gilluly et al., Principles of Geology, 1959, p. 461.

S.N. Davis and R.J.M. DeWiest, Hydrogeology, 1966, pp. 181–182.

J.G. Ferris et al., Theory of Aquifer Tests, Geological Survey Water–Supply Paper 1536–E., 1962, p. 76.

J. Hnatiuk and J.W. Martinelli, Field Case Histories, Oil and Gas Reservoirs, SPE Reprint Series, No. 4a, 1975, pp. 7–8.

C.S. Haase et al., Proceedings of Waste Management '85, Mar. 25–28, 1985, p. 1.

R.C. Earlougher Jr., Advances in Well Test Analysis, SPE Monograph Series, 1977, p. 1.

S.N. Shah and Y.N. Lee, SPE Production Engineering, Nov. 1986, p. 437.

Well Completions, SPE Reprint Series, No. 5a, vol. 1, 1978, table of contents, pp. 150 and 170.

H.O. Weeren et al., Oak Ridge National Laboratory, Report No. ORNL/CF–81/245, May 1982, pp. 1 and 18.

H.O. Weeren et al., Oak Ridge National Laboratory, Report No. ORNL–TM–4713, Nov. 1974, pp. 20, 21, 26 and 27.

W. de Laguna et al., Oak Ridge National Laboratory, Report No. ORNL–4259, pp. Aug. 1968, table of contents and pp. 48, 51, 187 and 188–201.

G.R. Holzhausen et al., Proceedings, $26^{th}$ U.S. Symposium on Rock Mechanics, Jun. 26–28, 1985, pp. 341–353.

K.G. Nolte and M.B. Smith. Journal of Petroleum Technology, Sep. 1981, pp. 1767, 1768 and 1770.

G.R. Holzhausen et al., Proceedings of Applied Oilsands Geoscience, 11–13, 1980.

K.G. Nolte, SPE Production Engineering Journal, Feb. 1988, pp. 31 and 37.

G.R. Holzhausen and H.N. Egan, SPE 16362, SPE California Regional Meeting, Apr. 8–10, 1987, pp. 379–385.

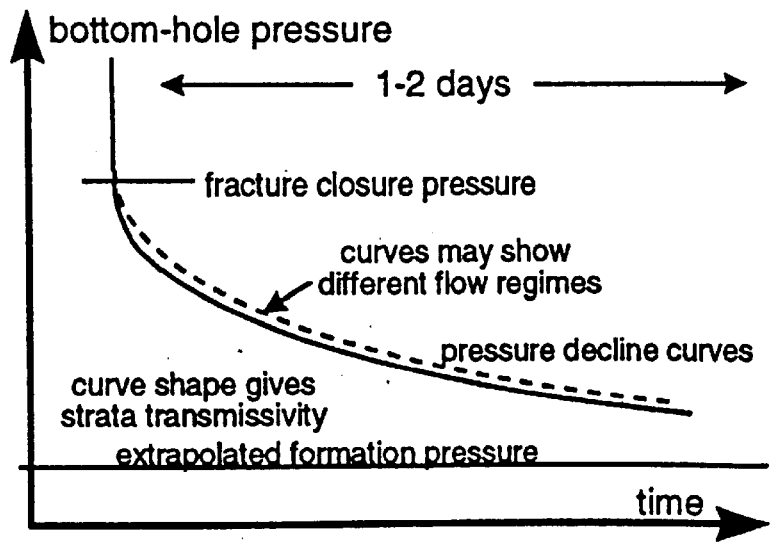
Fig 4: Pressure Fall-off Curve Analysis
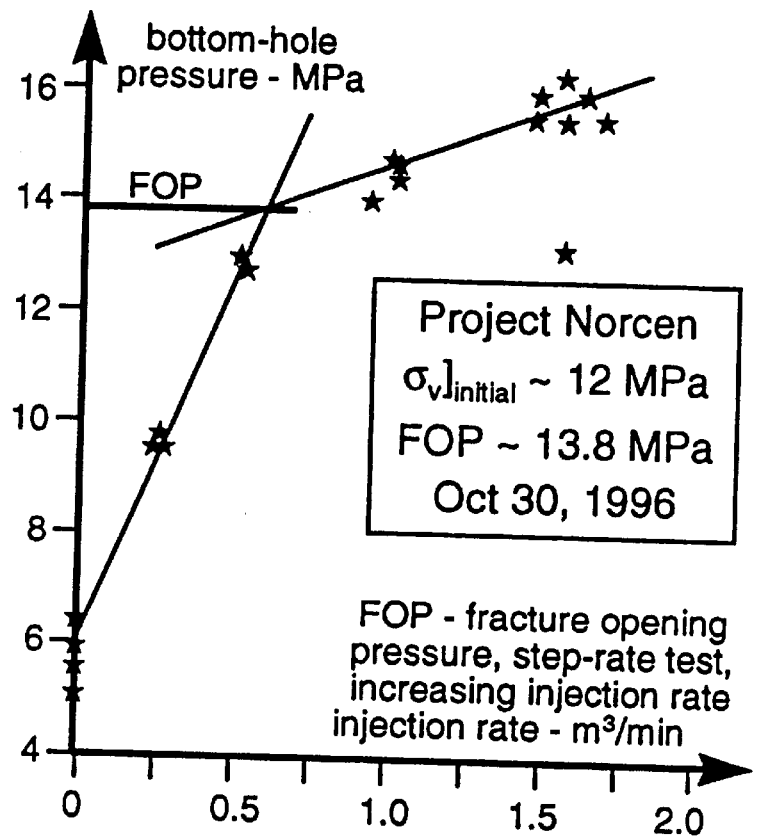
Figure 5: Fracture Pressure Step-Rate Test

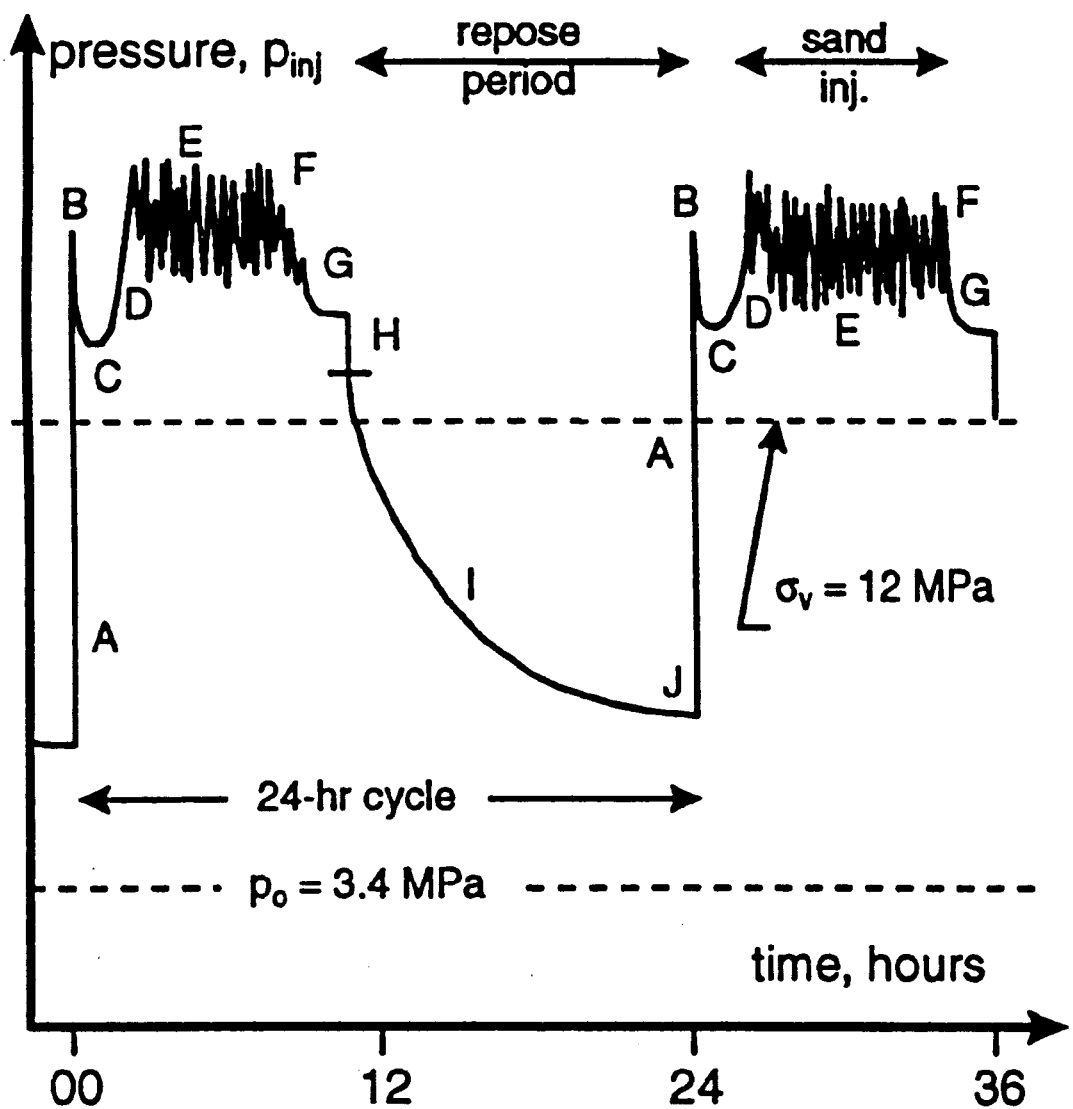
Fig. 6: Typical SFI data for fine-grained sand and waste water slurry at 540 m depth.

APPARATUS AND METHOD FOR SUBTERRANEAN INJECTION OF SLURRIED WASTES

This is a Continuation-in-Part of application No. 08/713,358, filed Sep. 13, 1996, now abandoned.

FIELD OF THE INVENTION

The invention relates to an apparatus and process for disposal of solid wastes in slurried form by deep injection into rock formations. Aspects of the invention include the parameters for selecting a desirable site, preparation of the waste-bearing slurry, injection conditions and methods, monitoring of the site during and subsequent to the injection, and particular apparatus for carrying out the same.

BACKGROUND OF THE INVENTION

The deep injection of wastes of various types into deeply-buried rock formations is a relatively recent field. This approach has been suggested for use with radioactive and other types of toxic wastes. For example, U.S. Pat. No. 5,310,285 (Northcott) relates to the injection burial of radioactive and other wastes of varying toxicity. The principal advantage of this technique is the potential for stable retention of wastes within a deeply-buried formation over a geological time span.

In general terms, the process involves the preparation of a water-based slurry within surface-based equipment and pumping the slurry into a well that extends relatively deep underground into a receiving stratum. The basic steps in the process include the identification of an appropriate site for the injection, preparing an appropriate well, formulation of the slurry, performing the injection operations, and capping the well. Preferably, monitoring is conducted during and after the injection to assess the slurry injection conditions and the conditions of the surrounding rock formations.

An appropriate target stratum is characterized by pores, fractures or the like. Fractures may also be created within the formation by the injection of wastes under pressure. This approach is taken in U.S. Pat. No. 5,314,265 (Perkins et al.). Alternatively, a target strata may be selected that contains existing fractures or pores, as described in U.S. Pat. No. 5,489,740 (Fletcher). As well, it is desirable that the target zone be depleted of hydrocarbons or other potentially valuable products, to prevent later intrusions into the site.

Selection of an appropriate permeable injection stratum leads to rapid bleed-off of fluids, so that the presence of a carrying agent is eliminated and the solids cannot travel far. Furthermore, once high pressure injection ceases, the solids become permanently entombed within the target stratum by the imposition of the great weight of the overlying strata. The choice of a site with a high permeability horizontal flow system is intended to direct noxious or toxic carrier liquids or leachate to flow laterally, in order that within a reasonable time frame they will not mix with potable groundwater. The choice of a target stratum with adequate volume, for example a depleted oil reservoir, assures that sufficient storage volume exists to accommodate injected fluids without a regional increase in pore pressure.

The choice of a sedimentary environment which is overall relatively rich in clays means that the leachates which are gradually developed from the solid wastes are rendered more innocuous through cation exchange and adsorption of organic molecules. As an example, a site with multiple low permeability clay-rich beds overlying the target stratum will absorb substantially all noxious ions and dissolved species before long-term contact with shallower groundwater takes place.

Also, the great depth of the burial results in long flow paths for leachates, slow groundwater velocities and a relatively high cumulative exposure to absorptive minerals.

A persistent problem faced by this method is the potential for the eventual migration of the wastes out of the target area and into an aquifer or other undesired destination. This danger may be minimized in part through the selection of an appropriate geological formation to serve as the target for the wastes. However, it is still desirable that the spread of wastes underground be monitored, ideally through the use of surface monitoring techniques conducted during and after the injection process.

As well, in light of the costs of disposing of wastes by this method and the stringent regulatory environment surrounding the disposal of toxic wastes, it is desirable that monitoring of several additional variables be conducted. This serves to optimize the slurry mixture, injection pressure and rate and total injection amount. Appropriate monitoring permits an efficient injection process with an optimum amount of slurry being injected. In this way, neither an excessive amount will be injected that might spread beyond the target zone, while generally fully saturating the target zone to make efficient use of the well.

The slurry fraction injection ("SFI") technique for disposal of solid wastes in slurry form within a porous formation involves a limited hydraulic fracturing of an appropriate target rock formation, followed by injection of wastes into the formation. This method has has been previously disclosed in general terms (see M. S. Bruno et al., SPE Publication No. 29646). The process includes the step of identifying a suitable geological formation, characterized by flat lying, laterally continuous strata. The target stratum is ideally relatively porous and permeable, overlain by relatively impermeable and non-porous strata. Formation of the slurry may feature the addition of viscosifying or other agents. The slurry is injected in a series of discrete injection episodes lasting hours or days, separated by interinjection episodes. Monitoring is carried out during and after the injection process, and consists of wellhead and bottomhole pressure monitoring and surface deformation monitoring in the region surrounding the wellhead.

An object of the present invention is to provide monitoring to assess slurry absorption within the target stratum and the spread of the waste body within the target stratum.

Various types of wastes are suitable for disposal by subsurface injection. Potential candidates are wastes that do not react with the target strata, can be readily granulated and can form a slurry suspension in turbulent flow. Wastes that may be disposed of by this means include various substances that are particularly difficult to dispose of in the conventional waste stream.

An object of the invention is to provide a suitable means to dispose of a variety of wastes, including:

oily sand from petroleum industry operations, as well as waste drilling fluids and drill chips from well drilling operations and oily sand from tank-bottom clean-outs;

soil contaminated with toxic materials such as PCB, heavy metals, cyanide compounds, hydrocarbons, etc.;

dredging wastes;

municipal sewage sludge from which the organic wastes have been largely decomposed;

waste plastics, glass, and other solid materials;

fly ash, clinker or other residue from combustion of wood, coal or municipal wastes;

flue gas desulphurization sludges as well as recaptured particulates from smoke or emission abatement processes, whether in solid or aqueous suspension form;

high solids content sludges and residues from petroleum refining, including high ash content coke, heavy oil residues and removed solids.

Apparatus for the carrying out of the slurry injection process must meet several design criteria in order to dispose of a substantial volume of wastes at a high rate:

injection of slurry at a surface pressure between 6–15 MPa;

slurry injection rate of between 1.5 and 2.0 m$^3$/min. and 800 m$^3$/day, with injection being carried out for 12–14 hours/day;

slurry composition with a granular solids content between 15–35% and real-time waste concentration and slurry density control to maintain density between 1100 and 1500 kg/m$^3$;

process 200 m$^3$/day of granular wastes;

enhance slurry mobility with waste materials having about 10% by volume hydrocarbon content;

capability to accept slop or sand as waste material.

As well, the apparatus should be capable of operating on a generally continuous basis, and comprise an integrated system that is adapted to receive wastes, convert the wastes into an appropriate slurry, and discharge the slurry under pressure into a disposal well.

The operating parameters require equipment capable of injecting a relatively granular, highly viscous slurry at high rates and pressures. Preferably, the slurry formation and injection apparatus should provide the following:

a) relative ease of handling of waste material;

b) screening of granular waste material on a continuous basis;

c) a real-time monitoring apparatus to monitor and record injection parameters;

d) variable speed controls linked to the monitoring apparatus to control the various slurry-forming components and maintain consistent slurry quality and delivery rate;

e) relatively rapid set-up and disassembly of the system;

f) slurry formation equipment capable of shearing highly viscous material to increase slurry mobility and infectivity, maintaining slurry consistency within a relatively small range, and being capable of handling relatively large amounts of waste material, in the range of at least 100 m$^3$/day.

An object of the invention is provide apparatus that addresses these requirements.

Monitoring of conditions within the target stratum serves two functions. First, it insures that the injection procedure is optimized for maximal injection speed and overall waste injection volume. Second, it provides evidence to regulatory agencies and other outside bodies that the injection process is being properly implemented and that the wastes are being confined within the target stratum. These goals may be furthered by monitoring and recording several variables in addition to those outlined above. In particular, slurry density, pressure, volume and composition should be monitored and recorded at all times. Alterations in large-scale permeability within the target stratum, excessive pressure build-up, abnormal fracture pressure, too-rapid pressure decay or other anomalous reservoir responses can be identified and analyzed to decide if these present problems for the continuation of the injection process in a particular well. It is an object of the invention to provide monitoring means that address these requirements.

In one example, the use of SFI permits permanent, low risk disposal of Non-Hazardous Oil Field Waste, comprising waste material and produced water. Waste generated at an oil field location can often be re-injected at fracture pressure through existing wells into the same subsurface formations from which the wastes originated. Another candidate for the SFI method is naturally occurring radioactive materials present in produced water, scale and sand from oil fields in many regions such as the Gulf Coast of the United States.

SUMMARY OF THE INVENTION

In light of the objectives outlined above, the present invention comprises an apparatus and method for optimizing the quantity of wastes that may be injected in an SFI process, and for monitoring the resulting waste body to assess its horizontal and vertical dimensions, and the rate of change in same.

The method comprises in one aspect the following steps:

a) identifying a generally permeable and porous target stratum, overlain by a layer of relatively low permeability strata;

b) calculating the approximate total available storage volume of the target strata, based on the approximate average thickness and area of the stratum, the average porosity of the stratum and the mechanical compressibility of the formation, and the target stratum storage capacity according to the following formula: Storage Capacity=dP/(dV×dt)

where dP=Injection Pressure-Shut in Formation Pressure dV=Volume of Injected Material dt=duration of Shut-in Period (i.e. inter-injection period).

c) calculating the optimal injectivity rate for the formation according to the following formula: Injectivity= Injection Rate/(Press$_{inj}$–Press$_{fmt}$), where Press$_{inj}$= injection pressure and Press$_{fmt}$=formation pressure.

c) preparing an at least partly cased well extending from the ground surface into the target stratum;

d) positioning a pressure gauge at the base of the well for measuring fluid pressure within the well;

e) perforating the well casing where the well passes through the target stratum;

f) performing pressure fall-off and step rate tests to evaluate flow behavior and injectivity at well bottom;

f) selection of a slurry having a grain size between 2 $\mu$m and 5000 $\mu$m, a solids concentration up to 40% by volume for grain sizes less than 150 $\mu$m and up to 20% by volume for grain sizes between 150 $\mu$m and 5000 $\mu$m;

f) injecting a slurry of waste materials in particulate form suspended in a carrier liquid into the well in a series of injection episodes separated by interinjection periods, with the injection pressure being greater than or equal to the fracture or overburden pressure and far greater than the natural water pressure in the target strata;

g) measuring the well bottom pressure of the slurried wastes during each injection episode and interinjection period; and h) terminating the injection process when the target strata is generally fully saturated with slurried wastes, as determined by the volume of wastes injected and the calculated available storage volume.

Preferably, the process is accompanied by a suite of monitoring procedures carried out before, during and after the injection process, as follows:

i) monitoring the slurry injection and emplacement by means of measurements of wellbottom pressure within the injection wells to assess formation pressure response to the waste injection, as well as permitting pressure fall-off tests and assessment of SFI and formation mechanics;

ii) monitoring wellbottom hole pressure within observation wells displaced from the injection wells within about 400 meters to provide assessment of formation pressure gradients and SFI mechanics;

iii) step rate injection tests conducted within the injection well, to assess fracture extension rate and formation pressure response, as well as closure stress gradient and waste containment within the formation;

iv) fluid level measurements within the offset monitoring wells to assess distribution of pressure gradients within the waste emplacement zone and to provide a measurement of waste containment;

v) tracer logs (temperature or radioactive tracer injection and measurement using geophysical wireline logs) within the injection well, to determine the extent of hydraulic isolation of the formation and wellbore during the injection process and an assessment of fracture orientation within the target formation;

vi) monitoring of surface deformation in the region about the wellhead through collection of tiltmeter data to assess the fracture orientation and azimuth, which permits as well a reconstruction of fracture geometry, horizontal and vertical dimensions and spread of the waste body within the target formation and the rate of change of same, and deformation within the formation, as well as a further assessment of the SFI mechanics;

vii) injection parameter monitoring (real time recording of injection pressures at wellhead and wellbottom, casing pressure, injection rate, injection volumes and slurry density) to permit a correlation of formation response with the SFI operating parameters;

viii) material sampling of the slurry is conduced regularly and frequently to accommodate various local regulatory requirements.

The method is further characterized in that the pressure and flow rate of slurry during each injection episode is adjusted to maintain a generally steady pressure at the well bottom, as measured by the wellbottom pressure gauge. An injection episode is terminated when the well bottom pressure climbs a predetermined amount above the steady state level, indicating blockage within the target stratum. An interinjection period is terminated when the well-bottom pressure drops a predetermined amount below the steady state level, indicating sufficient dispersal of the injected fluid within the stratum.

In a preferred regime, the SFI process commences with an initial injection of carrier liquid (typically water) at a high rate to initiate hydraulic fracturing within the target formation. The formation pressure will as a result fall to a stable injection level as a result of bleed-off. Particulate solid matter and slops are gradually introduced into the carrier until the selected target concentration is reached. Waste-bearing slurry injection ("SFI") is then carried on for between about 4 to 14 hours. This period terminates when an increased formation pressure results in the vicinity of the injection well. The slurry is then gradually replaced with a clear carrier liquid, with about 5–40 m$^3$ being flushed through the system. The well is then shut-in during an interinjection period of 10–20 hours, resulting in a sharp drop in formation pressure. The entire approximately 24 hour cycle is then repeated about 5–10 times, followed by a prolonged interinjection period of about 2–3 days, following which the daily injection cycle may be repeated a further 5–10 times, and so forth until the calculated storage volume is generally fully saturated.

Mathematical analysis of the pressure and surface deformation data may be conducted to determine the orientation and distribution of the injected slurry. This analysis assists in evaluating containment of the material within the disposal formation.

In one aspect of the invention, appropriate target strata and overburden are selected, with the target strata having a minimum average thickness of approximately 4 meters, a minimum average transmissivity of approximately 0.5 Darcy-meters and a minimum porosity of about 15% in those regions that have an average permeability above about 100 milliDarcy. The overburden confining strata will have a minimum thickness of about 10 meters with a maximum permeability of about 10 milliDarcy, and will preferably be relatively rich in clays. Preferably, the overburden will comprise alternating permeable and impermeable strata, with the target stratum being capped by a layer of low permeability stratum.

In a further aspect of the invention, post-injection monitoring of the target stratum is conducted to ensure that the waste solids entombed therein are not migrating from the target stratum. The post-injection monitoring comprises measurement of surface uplift and microseismic disturbances in the region of the injection well and determining therefrom the size (thickness and horizontal spread) of the solids emplacement zone. These measurements are monitored and recorded on a periodic basis to assess the extent of any spread of the solids emplacement zone.

In a further aspect, the slurry is prepared in a method wherein slurry additives (including viscosifiers, surfactants and adsorbing agents), slurry viscosity, slurry waste concentrations and slurry specific gravity are selected as a function of the following considerations:

composition of waste material (e.g. mud/sand/slop/water ratios)

daily slurry injection volumes produced sand grain size during injection fines/clay content during injection hydrocarbon content of the sand or viscosity of the muds and slops formation grain size and stress state formation geology heterogeneous effective stress and permeability distribution in the formation repeated loading and unloading of rock stresses wellbore cement quality wellbore completions quality (casing, perfing etc.).

In a further aspect, the waste pod monitoring data are analyzed to provide a quantitative assessment of hydraulic isolation and containment of the waste pod within the formation, as well as wellbore integrity.

In a further aspect, the injection process is controlled in response to the data generated by the monitoring procedures. The factors optimized in the SFI process include slurry composition, slurry density and concentrations of waste materials, flow rates, durations of the various injection cycles, injection pressures and injection volumes.

In a further aspect, the SFI method is used to dispose of viscous fluids such as oily sludges, municipal waste water treatment sludge and industrial wastes.

In a further aspect, an injection well is prepared for SFI as follows:

a) drilling (and not boring) of well;
b) selection of a mud system having a relatively high circulation rate to keep the hole clean and reduce filter cake build up;
c) cleaning of well bore;
d) final mud flush to clean filter cake from hole followed by scavenger slurry flush immediately prior to cementing;
e) cementing of wellbore while casing is rotated and moved vertically and using a low shrinkage, pliable expandable cement;
f) perforation of cement using low impact perforation techniques or casing cutting or slotting techniques, wherein the perforation interval does not exceed 10 meters in length and comprises a perforation density of about 20 shots/meter, with covering between 90° and 120° phasing.

The apparatus consists in its broadest aspect the combination of particle sizing means to remove oversize particles, a mixing-averaging means for the combining of particles with water to create a slurry, and a pump for the delivery of the slurry under pressure to the wellhead. The particle sizing means incorporates a reciprocally-driven multilevel screen deck that removes over-sized material (i.e. >0.5 cm) and foreign objects, and a means to direct a high-pressure water spray over the waste being sized. The sized particles are received in a receptacle which houses a rotatably-driven auger to mix together the sized particles and water to generate a slurry. The receptacle preferably houses dual rotatably-driven augers. The first auger is a mixing auger positioned in the pathway of material being introduced into the receptacle, and the second auger is positioned at the bottom of the receptacle. Pump means are linked to the receptacle to pressurize the slurry for delivery to the well.

The use of dual augers serves to shear highly viscous slurry material, thereby increasing slurry mobility and infectivity. As well, the dual augers permit delivery of a consistent slurry in terms of solids content and consistency, and permit efficient movement of a relatively large volume of granular waste material.

Waste receiving means are preferably provided to receive the wastes. These means may comprise a hopper linked by conveyor to the particle sizing means.

The apparatus may further include control means for controlling the system and data processing and storage means linked to the device to monitor and control the operation of the device and to monitor the injection process. A real-time monitoring system may be linked to the control means, comprising slurry density measuring means, pump/surface injection pressure measuring means; means to measure slurry injection rates and water input into the system, and a data logger. Preferably, the various components are driven by variable speed hydraulic motors controlled by the control means to provide consistent slurry quality and delivery rate and pressure.

The apparatus may further include a computer adapted to receive information from pressure gauges positioned at the bottom and surface of the injection well and within one or more monitoring wells. Preferably, information is also received from one or more surface uplift indicators and micro seismographs in the region around the injection well. The computer is programmed to receive the data and assess the approximate localization of the wastes within the injection strata.

These and other objects and aspects of the invention will be described by way of a detailed description and drawings illustrating preferred versions of the invention.

BRIEF DESCRIPTION OF THE DRAWINGS

FIG. 4 is a graph illustrating pressure fall off test following an injection;

FIG. 5 is a graph showing a step-rate liquid injection test result;

FIG. 6 is a graph showing in terms of wellbottom pressure a 24 hour SFI cycle.

DETAILED DESCRIPTION OF THE PREFERRED EMBODIMENTS

Figure 1:
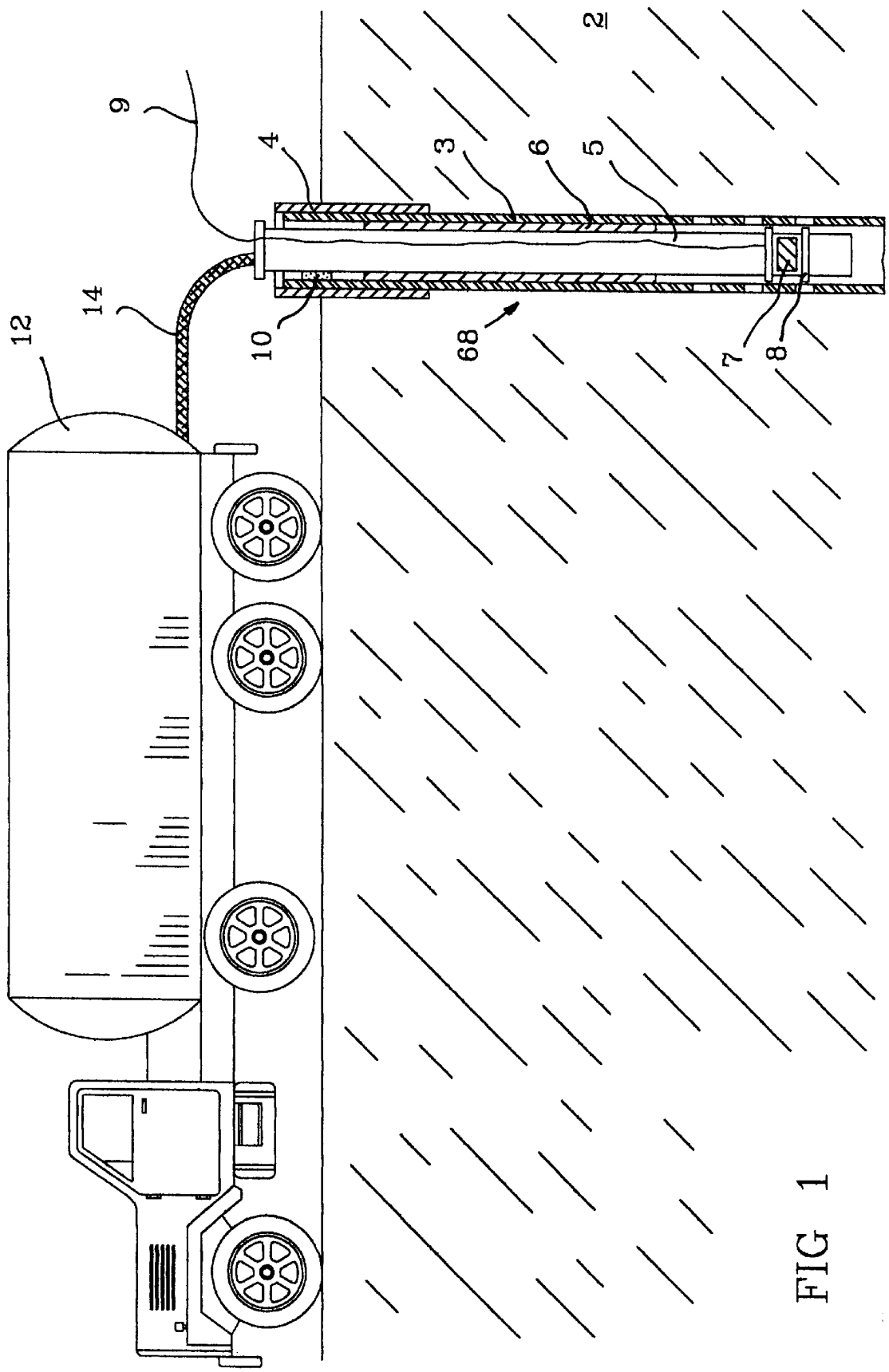
FIG. 1 shows a cross-sectional schematic view of an underground formation with an injection well therein, with monitoring and injection equipment in position.

The first stage of the process entails the identification of a suitable injection site and target stratum, identified in FIG. 1 as reference 2, and to determine the extent of the site. The preferred site and target stratum will have the following characteristics:

a) The site will be free of significant quantities of hydrocarbons and other valuable minerals that could become the target for exploitation in the foreseeable future.
b) The target stratum will have a minimum thickness of 4 meters and be at least 0.5×2.0 km in extent, or be connected hydraulically to permeable strata that have these dimensions.
c) The minimum transmissivity of the target stratum will be 0.5 Darcy-meters (average permeability in Darcy units multiplied by the stratum thickness in meters).
d) The direction of groundwater flow in the region around the stratum will be generally horizontal, i.e., deviating from the horizontal by no more than about 2.5 degrees.
e) The target stratum will comprise granular, poorly-cemented or uncemented sandstone or highly fractured porous rock. The rock will have no significant large-scale tensile fracture strength (tensile resistance to hydraulic fracturing) and a compressibility of at least $1 \times 10^{-6}$ kPa.$^{-1}$
f) The rock in the target stratum will not react chemically with the solid or liquid phases of the slurry to release any free gases or new noxious compounds, apart from the ordinary slow dissolution of minerals which takes place in aqueous systems.
g) The stratum will have a minimum porosity of about 15% in the portions that have a permeability above 100 mD (milliDarcy).
h) The stratum will not be intersected by any faults or other geological features that could give direct or easy access from the stratum to surface groundwater.
i) The target stratum will be overlain by at least 1–2 meters, and preferably 10 meters of low permeability overburden strata with a maximum permeability of 10 mD, for example a ductile shale or clayey siltstone. The overburden will preferably consist of alternating permeable and impermeable stratum (less than about 10 milliDarcies). This capping stratum is typically a thick, ductile non-faulting shale to best provide hydraulic isolation and a stress barrier to upward fracture propagation. The overlying permeable zones absorb wastes if hydraulic isolation of the target is breached and also act as further fracture barriers. The alternating stratigraphy further serves as a barrier to contamination of overlying groundwater zones and directs flow laterally rather than vertically.

Additional requirements are imposed for the selection of target strata and preparation of the injection well where it is desired to dispose of wastes that will produce mildly or substantially toxic liquids (as opposed to merely salty or noxious), whether such liquids comprise the injection fluid itself or leachate resulting from interaction between the solid wastes and the carrier liquid. These additional requirements are, at a minimum:

a) The well depth will be a minimum of 250 m in regions of modest surface elevational differences (20 m or less) and 500 m in hilly terrain (20–200 m).

b) The well will be isolated from all shallow groundwater sources by laterally continuous overburden strata that extend a minimum of about 10 km in all directions. These barrier strata will have a combined thickness of 50 m, counting only those strata that are at least 5 m thick and shall have an aggregate transmissivity to water no greater than 0.02 Darcy-meters.

c) There will be at least one "security zone" consisting of a permeable layer above the target zone to bleed off any liquid that might migrate upwards and to blunt the upward propagation of fractures. The security zone should have a transmissivity of at least 1.0 Darcy-meters and be dominated by horizontal groundwater flow, unconnected to shallow potable water sources. Preferably, at least one such zone is within 100 meters of the target stratum, and is greater than about 2 meters thick on average. This zone also serves as a barrier to contamination of overlying groundwater zones.

d) The groundwater in the target stratum, security zone and all other affected strata must not be a source of potable water, and must be shown to be hydraulically isolated from regional potable drinking water (no local faults through jointed rocks). This isolation can be demonstrated isotopically or through groundwater or lithostratigraphic studies.

e) The overburden may include a sedimentary sequence that includes minerals such as clays or zeolites which have the capacity to absorb wastes such as heavy metals and organics. This aspect permits moving liquids and leachates to contact large amounts of clay minerals in shale, clayey silts and in the interstices of unconsolidated sandstones, for the absorption of heavy metals, organic molecules and other contaminants.

The horizontal stratification and high permeability of the target stratum ensures that long term pressures do not build up, that emplaced solids remain close to the injection well and that the carrier liquids dissipate uneventfully in the stratum. The porosity, lack of large-scale cohesion and and low fracture resistance mean that fracture initiation and extension take place repeatedly without blockages or excessive treatment pressures.

The injection well is prepared by drilling into the target stratum, as described in detail below.

A waste-bearing slurry is prepared, with solid wastes being suspended in the slurry in particulate form. The maximum particle size of suspended wastes is about 5 mm with no more than 15% of the particles being larger than 2.5 mm. The most desirable range of mean grain size of the slurry is between 2 $\mu$m and 1000 $\mu$m. The solids concentration should be a maximum of 40% by volume for fine grained materials (less than 150 $\mu$m particles) or 20% for courser materials (150 $\mu$m–500 $\mu$m). Granular waste streams with substantial proportions greater than 1000 $\mu$m will be specially analyzed to ensure that the concentration of large particles is sufficiently low as not to block perforation openings during injection.

Slurry design parameters include:

the amount of non-dissolved solid material in the slurry;

the liquid phase viscosity (which will affect the injection rate and underground pressure bleed-off);

colloidal material content (clay and polymer content);

non-aqueous liquids content (e.g. oils and other immiscible liquids);

content of cementitious agents (Portland (tm) cement, lime, etc.); and additives used to enhance or alter the rheology of the slurry, such as polymers, thickeners, gels or emulsifiers.

Cementitious agents are added to slurries that include wastes of intermediate or high toxicity, such as PCB-contaminated soil, radioactive wastes, and heavy metals or arsenic compounds. The use of cementitious agents reduces the permeability of solid waste materials within the target zone. Thus, after the carrier liquid bleeds off, a solid waste body results that has a permeability substantially lower than that of the surrounding rock, with a consequent hydraulic isolation of the target waste body and a reduced leachate generation rate. Cementitious agents may include:

finely ground gypsum, limestone or lime

Ground FGD (flue gas desulphurization) sludge, which serves as permeability blocking agent ground shale, clay or other finely divided material synthetic non-biodegradable polymer agents Portland (tm) cement or other commercial cements or pozzolanic cementitious agent fly ash or finely ground combustion clinker.

The injection conditions, including the slurry composition are optimized for the particular injection conditions by determining slurry additives (including viscosifiers, surfactants and adsorbing agents), slurry viscosity, slurry waste concentrations and slurry specific gravity, as well as other SFI variables, as functions of the following considerations:

Composition of waste material (e.g.. Mud/sand/slop/water ratios). An optimum mix is required to avoid excess injection pressures, formation blockage, injectivity maintenance, wellbore integrity and pump wear. The specific rations depend on many factors, many of which are identified below. The minimum water to waste rations is approximately 4:1 and the minimum sand to viscous fluid rations is approximately 0.5:1.

Daily slurry injection volumes. Typically, upper slurry volume limits of 800–2000 m$^3$ and solids volume limits of 200–300 m$^3$ per day per injection well are used to insure that no well or formation damage occurs. Higher volumes are permissible only if geological parameters can be shown to be adequate so that the larger volumes do not lead to formation injectivity impairment, blockage, excessive pressurization or unacceptably slow pressure decay rates.

Maximum sand grain size during injection. The maximum grain size is controlled by two factors: the opening diameter of the perforations in the case wellbore and the concentration of the large particles. The limit required is that the ration of the perforation opening diameter, $D_{perf}$, to the diameter of the largest grains, $D_{max}$, be 5 or less, and that there be no more than about 15% of the granular solid portion of the slurry in the diamter ration range of about 5–10. Unless the perforations are specifically designed accordingly, the maximum grain size should be less than about 0.5 mm.

Fines/clay content during injection. Excessive amounts of fine-grained material can lead to an unacceptable formation blockage, resulting in excessively high treatment pressures during waste injection. Accordingly, the percentage of clay materials (grain size of less than about 2 microns) is limited to about 10% by volume of the total or, if the clays are not geochemically active, to an amount that does not lead to an excessive slurry viscosity. However, a greater clay content may be allowed if the formation geological characteristics are shown to be adequate to avoid injectivity impairment, slow pressure decay or excessive treatment pressures.

Hydrocarbon content of the sand or viscosity of the muds and slops. The hydrocarbon content limit is related to the viscosity of the hydrocarbon. For example, if the viscous fluids to be disposed contain more that 10% by volume of viscous crude oil, having an oil viscosity greater than 1000 cp, the slurry is diluted with make-up water to comprise a maximum of about 10% oil content by volume. Different limits apply for low viscosity oils and emulsified waste materials. The geological characteristics of the target stratum also is a factor. A courser-grained stratum having a mean grain diamter of greater than about 150 microns will accommodate without formation impairment a higher oil content than will a finer-grained stratum.

Formation grain size and stress state. SFI is most effective and secure in strata where there are no large pre-existing tectonic stresses that could lead to wellbore impairment or formation shearing during the injection treatment. Specifically, the ration of the major and minor principal stresses should be less than about 3.0.

Formation geology. SFI is conducted in target zones comprising sandstones, limestones, chalk or diatomite. As already discussed, the most favorable target stratum is a permeable uncemented sandstone overlain by a sequence of impermeable shales and permeable beds. These geological characteristics dictate aspects of the slurry design, including grain size and slurry content.

Heterogeneous effective stress and permeability distribution in the formation. Geological and rock mechanics studies must demonstrate that the stress state is acceptable and that there are not likely to be highly heterogeneous stress distributions that could he detrimental; to SFI activity. Accordingly, the permeability characteristics of the target zone must also be demonstrated not to be excessively heterogeneous in the lateral or vertical directions. The slurry density, waste concentrations and rheology must minimize the development of long term formation stress and pressure gradients in the target zone.

Repeated loading and unloading of rock stresses. SFI generates substantial load changes with each cycle. The purpose of pressure and deformation monitoring is partially to ensure that these do not become so large as to lead to wellbore or formation impairment. The slurry density, waste concentrations and rheology must minimize the development of long term formation stress and pressure gradients in the target zone.

Wellbore cement quality. Before a pre-existing well is adapted for SFI use, the cement between the casing and the rock must be shown to be of a sufficient quality to assure that upward inter-formation leakage is unlikely to occur. The slurry density and waste concentrations and compositions must be designed in order to minimize cement cracking and deterioration of the casing cement bond and deterioration of the formation cement bond. Preferably, a cement bond log is performed and examined. If a new dedicated SFI well is prepared, a specific approach to cementation is taken using a cement formulation with low shrinkage and a good bond potential.

Wellbore completions quality (casing, perfing etc.). The SFI wellbore must pass pressure tests demonstrating that it can withstand pressures higher than the maximum to be encountered during slurry injection operations. The design of the perforations should be in accordance with the guidelines stated above relating to grain size, with the perforations having a diameter about five times the diameter of the largest grain size that will pass the waste screening process. Perforations may be fully phased and the length and location of the perforated interval will be dictated by the geological parameters of the target zone so as to minimize the risk of wellbore impairment and to maximize access to high permeability rock in the formation. The slurry density and waste concentration and composition must be designed to minimize blockage of the perforations, plugging of the injection tubing, plugging of the well across the injection interval and to minimize back flow of waste material during interinjection shut down periods.

In one version, the slurry can incorporate a high percentage of shale chips and clays, approximately 50%–90% of the solids portion by volume, in order to reduce the risk of poor-quality leachate generation within the target stratum. With this approach, once the waste material is compacted at depth, the solidified material possess a reduced permeability with a high adsorptive capacity. This method is particularly useful for disposing of low or intermediate-level radioactive wastes or other hazardous wastes.

The slurry mixture may be tested prior to injection for the reduction in its permeability. The tests may comprise quantitative analysis using high-pressure uniaxial and/or triaxial compressibility cells with creep testing and fluid flow rate testing methods. To test the ultimate permeability of a particular cementitious slurry, a sample of the mixed slurry is placed in a test chamber and subjected to the overburden stress, pore pressure and temperature it will experience at depth. Compaction is allowed to occur by making provision for the drainage of expelled pore liquid, simulating the densification process at depth. These conditions are maintained on the test sample for a period of no less than two weeks, at which time an axial permeability test is carried out in the same manner.

The axial permeability test consists of determining the flow velocity through the test sample when a water pressure difference is imposed between the top and bottom of the compacted cementitious solid material. To be effective as a means of isolating the wastes from surrounding groundwater flow, the permeability should be no more than 1% of the average permeability of the target strata.

The slurry is also formulated to ensure rapid bleed-off of pressure during injection, so that fracturing does not propagate far, either vertically or horizontally.

The typical injection well 68 is similar to a conventional oil well, but with a larger diameter to accommodate a lining comprising a substantially full-length concrete production casing 3 and, where appropriate, a cemented surface casing 4. The well will not deviate from the vertical by substantially more than about 45 degrees. The lower portion of the well casing, comprising a length of at least 3 meters, is perforated. The well is prepared using controlled drilling practices (rather than conventional boring).

During drilling, a high rate of mud circulation is employed to reduce filter cake buildup and to keep the bore clean. A heavy grade casing is employed for the surface and production drill strings. Conveniently, the casing surface is roughened by sandblasting or the like prior to insertion, to enhance concrete bonding. An epoxy/sand coated casing may also be employed. After drilling, the well bore is cleaned by flushing with conditioned mud to remove drill cuttings and filter cake from the bore. Conveniently, the mud flush can employ about double the usual quantity of mud, followed by about 5 m³ of scavenger slurry immediately prior to cementing.

A low shrinkage, pliable and expandable cement should be used for cementing the well, in order that the repeated and sequential applications of pressure during the SFI process does not fracture or crack the concrete layer. A concrete lining extend from about the well bottom to at least above the 10 lowermost casing joints (assuming the use of conventional 10 m length casing units). In the cementing process, casing scrapers and centralizers are used to achieve a better cement bond with the casing. As well, the casing should be rotated and reciprocated vertically during cementing. The cement may be prepared using a continuous batch mixing method to achieve a generally constant cement weight. The cement should not bear weight for a period of time following cementing. When the concrete has cured, the casing and lining are perforated by means of low impact perforation techniques or cutting or slotting techniques. The perforation interval should not exceed 10 meters in order to sustain high injection pressures and rates. The perforation density is preferably about 20 holes/meter and covers between at least about 90° to 120° phasing (and preferably is fully phased) to ensure good radial distribution around the well.

An open-bottom injection tubing string 5 is lowered into the hole and there retained within a metal casing-packer 6 in such a manner that the lower part of the tubing string protrudes no more than 3 meters below the packer and at least 1meter above the uppermost perforation.

During installation of the tubing string, a hole-bottom electronic pressure gauge 7 is installed to measure pressure of the fluid within the tubing near the bottom of the hole. The gauge is submersible, and may comprise a strain gauge, vibrating wire or vibrating strip-type gauge, capable of measuring bottom-hole pressure from 7–70 Mpa. The gauge is installed in a stainless steel saddle 8 welded to the tubing string 0.5 to 3 meters above the top of the packer. The sensor provides an electronic signal to the surface through a multiconductor, high-pressure cable 9 strapped to the outside of the tubing and installed along with it. The gauge is employed to measure fluid pressure of the slurry during and after the injection. A second electronic pressure sensor or continuous pressure recording device 10 is installed within the annular space between the casing and the tubing at the wellhead.

The slurry may be formed either in advance and trucked to the site in the pumping truck 12, or prepared on site. The density of the slurry is monitored either at the pumping truck exit line 14 or at the exit line from the slurry formation apparatus. Where the slurry is mixed on site, the quantities of waste solids, aqueous carrier, additive solids and waste liquids entering the slurry are monitored.

Prior to slurry injection, it is desirable to conduct pressure fall-off and step-rate injectivity tests within the injection well in order to assess the formation flow behavior (formation permeability and transmissivity), formation geomechanical behavior (compressibility, fracture behavior, stress state), and potential slurry injectivity into the reservoir. The information obtained from this procedure is used both to optimize the injection protocol and during the slurry injection procedure to determine if anomalies are occurring. In particular, these tests assess whether the formation is suitable for long term (greater than about 2 months) and generally continuous (greater than 4 hours/day) injection. FIG. 4 illustrates a typical desirable pressure fall-off curve analysis, wherein the X-axis represents bottom-hole pressure and the Y-axis represents time, with the resulting curve representing pressure fall-off over time. An extrapolated formation pressure level is shown for comparison. The step-rate test also permits the determination of the required fracture extension rate and fracture extension pressure required for carrying out the SFI method. An example of a step-rate test is shown in FIG. 5, wherein the fracture-opening pressure is shown as a constant, with the bottom-hole pressure increasing in response to increasing injection rates.

Slurry is injected into the well in a series of one or more injection episodes of between about 3–30 hours each. The injection pressure of the slurry is sufficient to overcome the parting pressure of the formation. The natural pressure in the porous strata will be far less than the water pressure in the slurry, proving a strong natural gradient that draws the water away, leaving the solids component behind.

The individual injection episodes are separated by interinjection periods of between 5 and 100 hours, and preferably between 8 and 14 hours, depending on the response of the stratum. Each injection episode is initiated by pumping solids-free liquid through the system at a pressure sufficient to initiate fracturing of the target stratum. Typically, the flow rate during this stage will be about 1.5 m³/min. Solids are gradually introduced to the flowing mixture, and the target solids content is built up over 15–20 minutes. At the end of each injection episode, the solids content of the slurry is gradually diminished, the well is flushed with clear liquid and the well is shut in under pressure (i.e., while pumping). The wellhead and well bottom pressures are recorded at this stage and periodically thereafter throughout the interinjection episode. The interinjection shut in period is preferably between 10 and 72 hours. The shut in period permits the stress and localized pressure fields generated during the injection period to redistribute and dissipate.

In one preferred regime, the SFI process commences with an initial injection of carrier liquid (typically water) at a high rate to initiate hydraulic fracturing within the target formation. The formation pressure will as a result fall to a stable injection level as a result of bleed-off. A slurry is gradually introduced into the carrier until the selected target concentration is reached, to achieve SFI at an injection pressure ($Press_{inj}$) of between 1.05–1.4 times the overburden pressure, depending on the site and slurry properties. The injection episode is then carried on for between about 4 to 14 hours. Pressure variations of between 5–10% may occur in this period. During this period, an increased formation pressure results in the vicinity of the injection well. At the termination of the injection episode, the slurry is gradually replaced with a clear carrier liquid, with about 5–40 m³ being flushed through the system. The well is then shut-in during an interinjection period, resulting in a sharp drop in formation pressure. During this period, liquid flow within the formation typically consists largely of porous medium flow rather than the fracture flow which characterizes the injection episode. The entire process is repeated 12–24 hours later. Preferably, the entire injection/interinjection cycle is approximately 24 hours duration, resulting in a convenient daily cycle time. The daily injection cycle may be repeated about 5–10 times, followed by a prolonged interinjection period of about 2–3 days, following which the injection cycle may be repeated a further 5–10 times, and so forth until the calculated storage volume is generally fully saturated. This strategy permits a long term (2 months or more) injection regime. The cyclical injection episodes facilitate fracture re-initiation and propagation. FIG. 6 is a graph illustrating a typical 24 hour SFI cycle, with the vertical axis comprising bottom-hole pressure and the horizontal axis signifying time.

A successful SFI strategy will result in the wastes being deposited progressively outwardly from the injection well, while maintaining hydraulic isolation.

Where the SFI method is used for the disposal of viscous fluids such as oily wastes, municipal sludges, or industrial wastes, the slurry is injected into an appropriate target stratum in such a manner that the formation flow behavior (i.e. permeability and transmissivity) is not significantly impaired and permeability blockage is minimized. This minimizes fractures that tend to propagate out of the target stratum and breach hydraulic isolation.

Mathematical analysis of the pressure and surface deformation data may be conducted to determine the orientation and distribution of the injected slurry. This analysis assists in evaluating containment of the material within the disposal formation.

The injection well and the region surrounding the well are monitored by means of surface and subsurface techniques to optimize infectivity and to track formation response to the injected solids. Appropriate monitoring permits optimization of: the total slurry volume to be injected; the injectivity rate; the slurry density and composition; the duration of the injection and inter-injection episodes and the total period of use of the injection well. These factors are determined as follows:

a) The total slurry volume to be injected for each well or series of wells is a function of the projected interstitial volume of the target stratum. This is determined by assessing the size of the target stratum (both area and thickness), the approximate interstitial volume, and preferably also the mechanical compressivity of the stratum.

b) The target flow rate ("injection rate") for the slurry is determined by the speed at which the target stratum is capable of absorbing the slurry while maintaining a steady state well bottom pressure. Ideally, this pressure is between 115% and 135% of the overburden stress. The well bottom pressure is measured by the pressure gauge 7 positioned at the well bottom. The optimal infectivity is determined as: injection rate/($Press_{inj}$–$Press_{fmt}$), where $Press_{inj}$=injection pressure and $Press_{fmt}$=formation pressure.

c) The duration of each injection and inter-injection episode is determined by the rate at which the slurry spreads within the target stratum and the rate at which the pressure at well-bottom dissipates. The spread of slurry within the target stratum is assessed primarily by the magnitude and decay rate of ground surface uplift in the region around the well, as determined by tiltmeters or other surface uplift indicators. Typically, maximum surface uplift during an injection episode will be limited to a maximum of about 5 cm or such other value as may be set by a regulatory body. Once this amount of uplift has occurred, the episode is halted until pressure decays to an acceptable level (i.e. less than 80% of overburden stress) and the deformation rate is small.

d) The localization of the injected solids within the target stratum is determined by microseismic surveillance and, in the case of shallow ($\leq$800 m) disposal depths, measurement of surface uplift using tiltmeters or the like. Through known analysis techniques, the localization of the region of uplift provides an indication of the lateral spread of the embedment zone, and as well provides reconstruction of the fracture behavior in terms of geometry (dip, orientation, aspect ratio) and deformation (volumetric and shear formation). Microseismic surveillance assesses by means of known techniques the horizontal and vertical positioning of the zone.

The pressure responses of the formation during and after injection are analyzed to give the formation parameters, including permeability, transmissivity and radius of the altered zone. These parameters are tracked over time to ensure that the formation is responding in an optimal manner, if the formation is not responding well, direct alterations of the injection strategy may be made, including alteration of injection rates and periods. The slurry formulation may also be changed to increase the pressure decay rate. In general, if formation blockage or excessive pressurization appear to be occurring, the content of slops and mud will be diminished in favour of sand and water and the volume and duration of the clear water pre-treatment and post-flush will be increased.

Waste pod monitoring data are also analyzed to provide a quantitative assessment of the hydraulic isolation of the waste pod within the formation during and after SFI, as well as wellbore integrity. For example, surface deformation data are analyzed to determine the shape and location of the solids injected zone at depth. The zone is determined to be unacceptable and hydraulic isolation is in question, then slurry formulation changes are instituted or the formation around the well is deemed full. The analysis can also be based on formation pressure data analysis and geophysical tracer logging data analysis.

Geophysical logging techniques are used periodically to evaluate hydraulic isolation of the disposal formation during SFI operations. Experience has shown that near-wellbore formation flow and stress state changes occur readily during SFI operations. Radioactive tracer log and temperature log data collected concurrently provide a quantitative assessment of the hydrologic isolation of the formation and near well containment of the waste body.

Additionally, pressure characteristics within monitoring wells in the region around the injection well may be taken into account. An injection episode should be terminated if the well-bottom pressure within a remote monitoring well (more than 50 m distance) climbs by about 25% of its original pressure.

As well, any particular information that is available regarding the structure and seismic characteristics of the target stratum may be taken into account. For example, unexpected microseismic activity or anomalous pressure response in an adjacent monitoring well can result in a modification of one or more the parameters set out above.

An injection strategy suitable for use with predominantly particulate waste streams is as follows:

Maximum slurry injection rate: 1.1–2.0 times fracture extension rate
Daily slurry injection volume: 700–1500 m$^3$/day
Waste injection volume: 50–225 m$^3$/day
Av. slurry concentration: 5–30% sand by volume
Av. slurry density: 1000–1300 kg/m$^3$
Max. slurry density: 1375 kg/m$^3$
Injection Pressures 1.1 to 1.5 times the fracture extension pressure
injection episodes: 24 hour injection/interinjection cycle, including 4–14 hours/day injection episode
injection cycle: 5 day injection cycle, 2 days shut-in or 11 day injection cycle followed by 3 day shut-in.

The fracture pressure and extension values are determined by the step-wise injection tests and pressure fall-off tests described above.

Slop may be injected during the procedure to facilitate the sand injection, to avoid frac tip screen-outs, wellbore sanding and other clogging problems. Slop may be injected at the following stages:

during pre-flush to facilitate fracture injection;

during fracture screen-out conditions, when the wellbottom and head pressures unexpectedly surge.

For the latter slop injection procedure, a slug of slop (approx. 10 m$^3$) is injected at the rate of 10–15 m$^3$/hr., until the wellbottom pressure recovers to normal. During this procedure, the sand concentration in the slurry is reduced. The maximum slop injection should not exceed about 60 m$^3$/day.

An SFI strategy for disposal of predominantly viscous liquids is as follows:

Maximum slurry injection rate: 1.1–2.0 times fracture extension rate

Daily slurry injection volume: 700–1000 m$^3$/day

Waste injection volume: 50–100 m$^3$/day

Av. slurry concentration: ~15% slop by volume

Av. slurry density: 1000–1200 kg/m$^3$

Max. slurry density: 1250 kg/m$^3$

Injection Pressures 1.1 to 1.5 times the fracture extension pressure injection episodes: 24 hour injection/interinjection cycle, including 4–14 hours/day injection episode injection cycle: 5 day injection cycle, 2 days shut-in.

In this regime, sand may be introduced into the slurry to facilitate the slop injection, by minimizing injection pressure surge effects, avoidance of formation and wellbore plugging and other problems. Typically, sand and slop are injected in a series of alternating stages. For example, a slop slurry stage incorporating 30 m$^3$ slop material may be alternated with 20 m$^3$ sand material mixed with sufficient water to generate a suitable slurry. These two stages may be alternated until the daily slop injection target is reached. The injection cycle may be concluded with a 20–50 m$^3$ sand-based slurry injection, followed by a clear flush of approximately 50 m$^3$ water.

An example of a typical injection protocol developed for a site in East-Central Alberta is:

Target Stratum Description: 14 m. thick, 30% porosity depleted sandstone reservoir; compressibility of 10 kPa or higher; flat-lying (horizontal) of great lateral extent (>1 km in all directions).

Description of overlying strata: directly overlain by 100 m alternating shales and clayey silts; permeability less than 10 mD, except for several thin stringers (1–3 m) of permeability >100 mD, for lateral bleed-off of any vertically migrating fluid; from 100 m above the target to 250 m above the target, a continuous bed of ductile shale (horizontal) of extremely low permeability.

Slurry Composition: The carrier phase is waste water (weak brine) produced along with oil from an adjacent oil filed (70%–80% of slurry volume). The solid waste is fine-grained sand with a small fraction of clay (<1–2%) contaminated with heavy oil (15–30% of slurry volume). Also, the slurry may include 0–25% of "slops", i.e., ground surface wastes, including soil, sand or water mixed with spilled oil.

Injection Pressure: Measured at hole bottom, no greater than 140% of overburden stress.

Injection Rate: from 1.1 to 1.8 m$^3$/min. of slurry.

Total Slurry Volume: Max 800 m$^3$ in a 24 hour period. Total for well—100,000 m$^3$ of 20% solids content for a total of 20,000 m$^3$ of sand.

Average Injection Duration: 10 hours

Average Interinjection Period: 14hours

Maximum Surface Uplift: less than 1 mm for each episode.

Monitoring strategy: Four pressure monitoring wells in a square, each well being 150 m from the injections well; 12 tilt meters arranged in a first circle of 8 placed at 150 m radius around the injection well and a second circle of 4 at 300 m radius from the injection well. Annular casing pressure, tubing wellhead pressure and tubing well bottom pressure recorded during injection and interinjection episodes. Injection volumes, rates and solids contents measured and recorded.

In most applications, additional variables should be monitored and recorded, in particular slurry density, pressure, volume and composition. The pressure data from the injection and monitoring wells are used, together with step-rate injection test data, to evaluate the waste emplacement process.

In general, the process is accompanied by a suite of monitoring procedures conducted before, during and after the injection process, as follows:

i) Monitoring the slurry injection and emplacement by means of measurements of wellbottom hole pressure ("BHP") within the injection wells to assess formation pressure response to the waste injection, as well as permitting pressure fall-off tests and assessment of SFI and formation mechanics. The BHP sensors should have a minimum 0.1% full scope accuracy, very low hysteresis and thermal zero-shift and high resolution (approx. 0.025% FRO). These tests are typically conducted at 5 minute intervals during both interinjection and injection episodes. Further, a 5–60 second scan rate may be used for the first 60 minutes after the daily shut-in.

ii) Monitoring BHP within observation wells displaced from the injection wells within about 400 meters to provide assessment of formation pressure gradients and SFI mechanics. The observation well BHP sensors should have the same characteristics as the injection well BHP sensor, and the minimum scan rate is typically 15 minutes. Observation well BHP monitoring is typically conducted in projects involving greater than 3000 m$^3$/month or 10,000 m$^3$/year.

iii) Step rate injection tests ("SRT") conducted within the injection well, to assess fracture extension rate and formation pressure response, as well as closure stress gradient and waste containment within the formation. A baseline SRT is performed prior to the start of the SFI process and is repeated after every 3000–5000 m$^3$ of wastes have been injected, or at the end of the project.

iv) Fluid level measurements within the offset monitoring wells to assess distribution of pressure gradients within the waste emplacement zone and to provide a measurement of waste containment. Baseline levels are established at the start of the SFI process and the test is repeated daily during SFI injection.

v) Tracer logs within the injection well, to determine the extent of hydraulic isolation of the formation and wellbore during the injection process and an assessment of fracture orientation within the target formation. A preliminary baseline is established, and the test is repeated after every 3000–5000 m$^3$ of wastes or at the end of the project.

vi) monitoring of surface tiltmeter data generated in the region about the wellhead; to assess the fracture orientation and azimuth, as well as permitting a reconstruction of fracture geometry, horizontal and vertical dimensions and spread of the waste body within the target formation and the rate of change of same, and deformation within the formation, as well as a further assessment of the SFI mechanics. A baseline is established, and tests are repeated every 30 minutes throughout the project duration. Normally, 2–3 data sets per month are analyzed.

vii) Injection parameter monitoring (real time recording of injection pressures at wellhead and wellbottom, casing pressure, injection rate, injection volumes and slurry density) to permit a correlation of formation response with the SFI operating parameters. Monitoring is performed continuously, with a minimum scan rate of 1 second. Data is recorded to disk about every 5 minutes.

viii) Material sampling of the slurry is conduced regularly and frequently to accommodate various local regulatory requirements. Typically, this occurs weekly, with analysis performed monthly.

The monitoring strategy in any given regime is determined in part by the volume and type of waste to be disposed, the geological characteristics of the target stratum, the condition and completion of the wellbore, and the monitoring objectives, including any regulatory requirements.

Alterations in large-scale permeability, excessive pressure build-up, abnormal fracture pressure, too-rapid pressure decay or other anomalous reservoir responses are identified and analyzed to decide if these present problems for the continuation of the injection process in a particular well. For example, if the monitoring wells display sudden pressure responses, this would indicate that a discrete fracture plane is interacting with the remote wells, thereby suggesting that the fracture bleed-off is being impaired by permeability blockage. If this is the case, or if other anomalous responses are noted, the slurry design and the injection strategy are altered to rectify the problem and remain within the realm of rapid bleed-off and near-wellbore solids emplacement.

Injection procedures may be adjusted appropriately in the event that well-bottom pressure is decaying too slowly, if it appears that solids are being transported out of the target stratum, if the monitoring wells show anomalous pressure responses, or if other monitoring reveals substantive formation containment impairment. For example, slow strain relaxation and pressure decay may be due to excessive fines in the slurry, too large a volume injected within each episode or too short an interval between injection episodes.

The response of the reservoir stratum and overlying rock to the slurry injection may be assessed by way of the surface deformation data, in combination with the previously-determined capacity of the reservoir. The reservoir response may be determined from this data as follows:

a) The tiltmeter response data over the time period of interest (i.e. 1 hr. to several days) is examined to ensure against anomalous noise signals in the data base.

b) The magnitude and direction of the surface tilt responses provide input to a computer programmed to analyze the tiltmeter data.

c) The analysis provides an estimate of the size and shape of the zone of solids emplaced at depth over the time period analyzed.

A variety of monitoring tools may be used in addition to surface deformation measurement to assess the mechanical formation response to the injection. Changing formation response can result in changing and multiple flow regimes, that in turn may require alteration to the SFI strategy and regime. Typical changes that may be monitored by the methods described herein include changes in formation compressibility and stress state, rate of dynamic fracture propagation and orientation (dip, azimuth), dynamic in situ pressures and stress gradient formations and stress dissipation, formation mechanical deformation and yielding, overburden straining and bending, and asymmetric distribution of waste material around the injection well.

Confirmation that the injection process is proceeding properly is obtained by insuring that there is a rough balance between the solids volume input and the volume of deformation, by comparing known input to the results of the mathematical analysis.

The surface uplift data allow discrimination between vertical and horizontal fracture orientations by virtue of the magnitude and direction of the tilt vectors from an array of 10–20 tiltmeters positioned around the injection well. This indicates whether vertical or horizontal material transport away from the wellbore may be occurring. In general, the tilt response for long-term injection wells should be dominated by horizontal fracturing components. The tilt data can be analyzed in terms of total deformation to give limits on the extent of the deformation in the reservoir, and by this means the approximate radial and preferably vertical extent of the emplacement zone can be assessed. Also, the tilt or deformation data can be used directly to demonstrate that the ground surface deformations are small and meet limits which might be set by regulatory guidelines.

The time-dependent decay of surface tilt changes and internal pressures provides direct evidence of the speed by which the reservoir and the overlying rocks are responding to the volumetric and pressure changes induced by the injection activity. If deformations continue slowly for many days after an injection episode, combined with a slow pressure decay rate, it is proof that the reservoir is approaching capacity, that permeability has become blocked, or that injectate has migrated to a zone of low fluid transmissivity. Conversely, rapid decay and cessation of deformation is evidence that the reservoir is responding as expected with efficient bleed-off and solids localization near the wellbore. These measures over time are used directly to adjust the slurry design and the injection strategy to achieve the best possible reservoir response to the injection. Mathematical analysis of the pressure and tilt data allows for reconstruction of the size and distribution of the injected material.

The method may also include microseismic monitoring of the surrounding region to assess the injection process. Such monitoring involves detecting and analyzing small seismic disturbances associated with rock deformation that accompanies the slurry injection. Microseismic monitoring is used in conjunction with the surface deformation and uplift data to determine the approximate dimensions horizontally and vertically of the solids emplacement zone. The locations of microseismic events are plotted three-dimensionally over time, and resulting identification of the microseismic emission field identifies the size and growth rate of the solids emplacement zone. If large amounts of microseismic activity are observed high above or far away from the perforation locations in the well, the nature of the signals is analyzed along with the surface uplift response to the injection, to ensure that solids are not migrating out of the injection zone. If the microseismic emissions continue beyond the time of active injection by several hours or days, this is taken as evidence that pressures are not decaying sufficiently rapidly or have entered a zone of lower permeability. The data from microseismic monitoring are combined with other measures (tilt, volume, rate, pressures) to permit the injection process to be controlled and optimized continuously.

The monitoring data may be used to perform the following:

a) optimization of SFI process in terms of length of injection cycles, slurry composition, daily injection volumes and injection rates and pressures;

b) maximizing hydraulic isolation and containment of the injected wastes;

c) providing diagnostic information to evaluate formation stress state and flow response, well integrity, formation containment and response, in situ waste distribution, formation storage capacity and formation infectivity during the injection process;

d) personnel safety during injection procedures;

e) evaluation of the target stratum mechanical and flow responses to the injection process; and f) determination of the distribution of the injected material within the target stratum.

The nature and extent of monitoring is a function of the volume of waste to be injected, the geological characteristics of the target stratum, the nature of the waste material, the wellbore characteristics, and the monitoring objectives (e.g., regulatory, personnel safety, etc.).

The monitoring data are analyzed to carry out the operations described above with a computer linked to the monitoring instruments described above and programmed to perform the following operations:

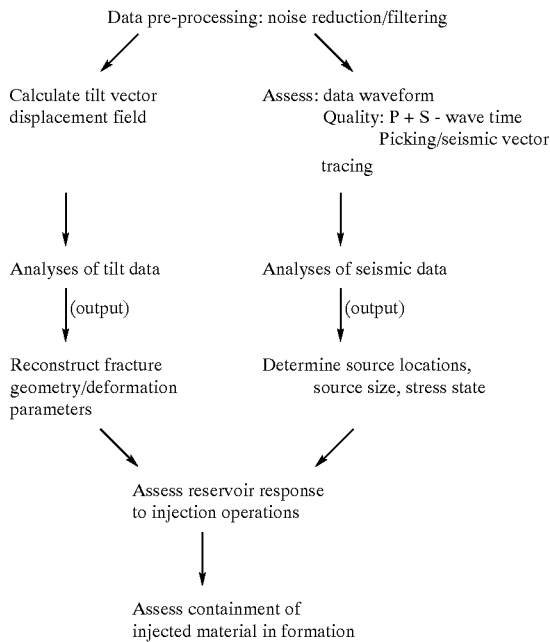

These operations permit the rapid assessment of events within the reservoir, and permit the dimensions of the solids containment area to be evaluated. This in turn permits the user to demonstrate that the solids are being appropriately contained within the target stratum.

Post-injection monitoring is carried out to ensure that the solid wastes are generally contained within the target stratum. The surface deformation and microseismic monitoring described above is carried out subsequent to the injection, typically for a period of several days. If the site has been properly selected and the injection properly carried out, the post-injection monitoring should disclose stable underground conditions. If surface or subsurface instability continues after the injection terminates (allowing for a period of approximately one week for stabilization to be achieved), this is evidence that the solids are potentially migrating,out of the target zone.

Surface deformation and microseismic analysis as described above is also deployed in the post-injection period to determine on a periodic basis the positioning of the solids emplacement zone, to ensure that this zone is not expanding beyond set limits and is not potentially communicating with potable water.

Figure 2:
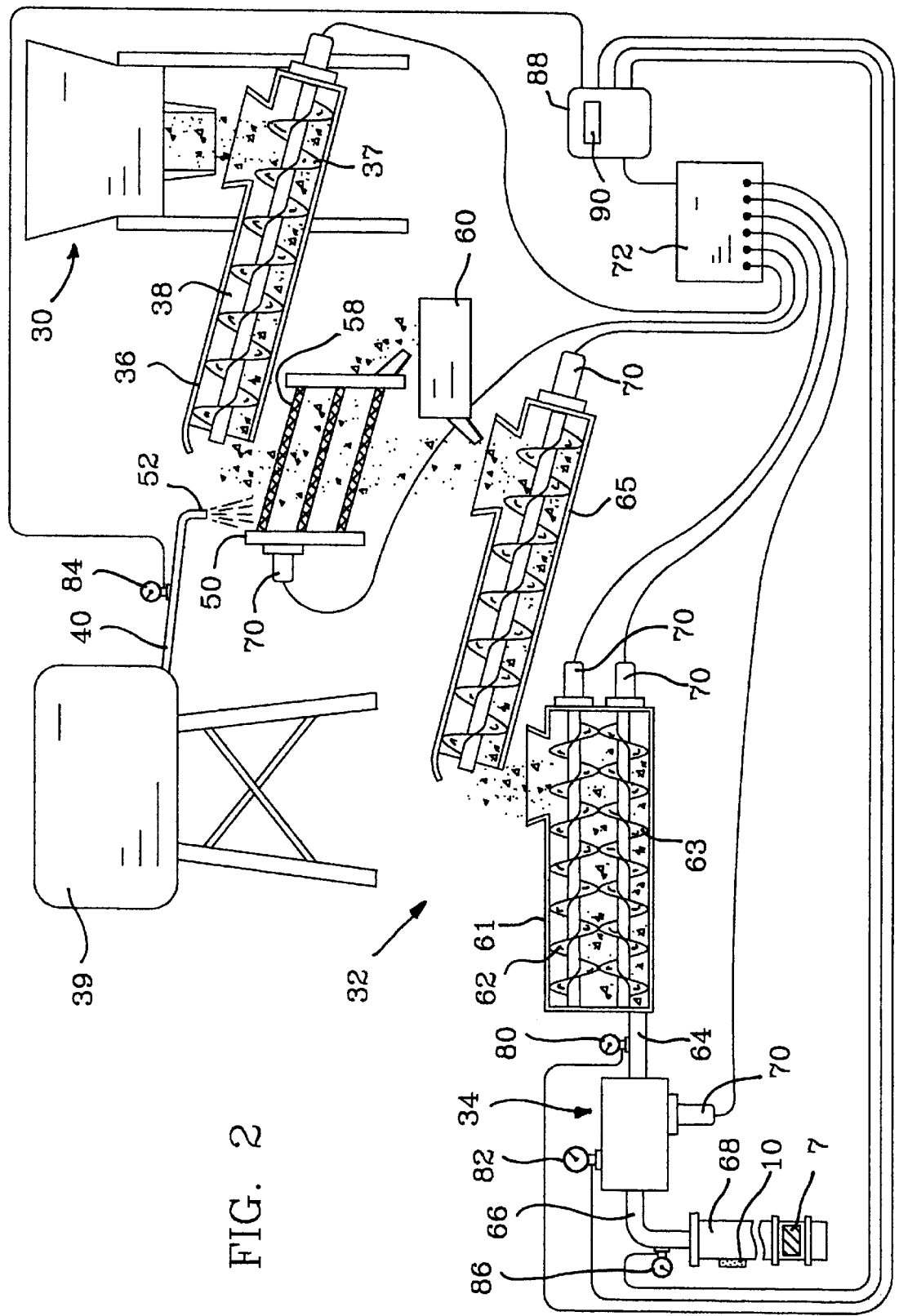
FIG. 2 is a schematic view of the apparatus according to the present invention.
Figure 3:
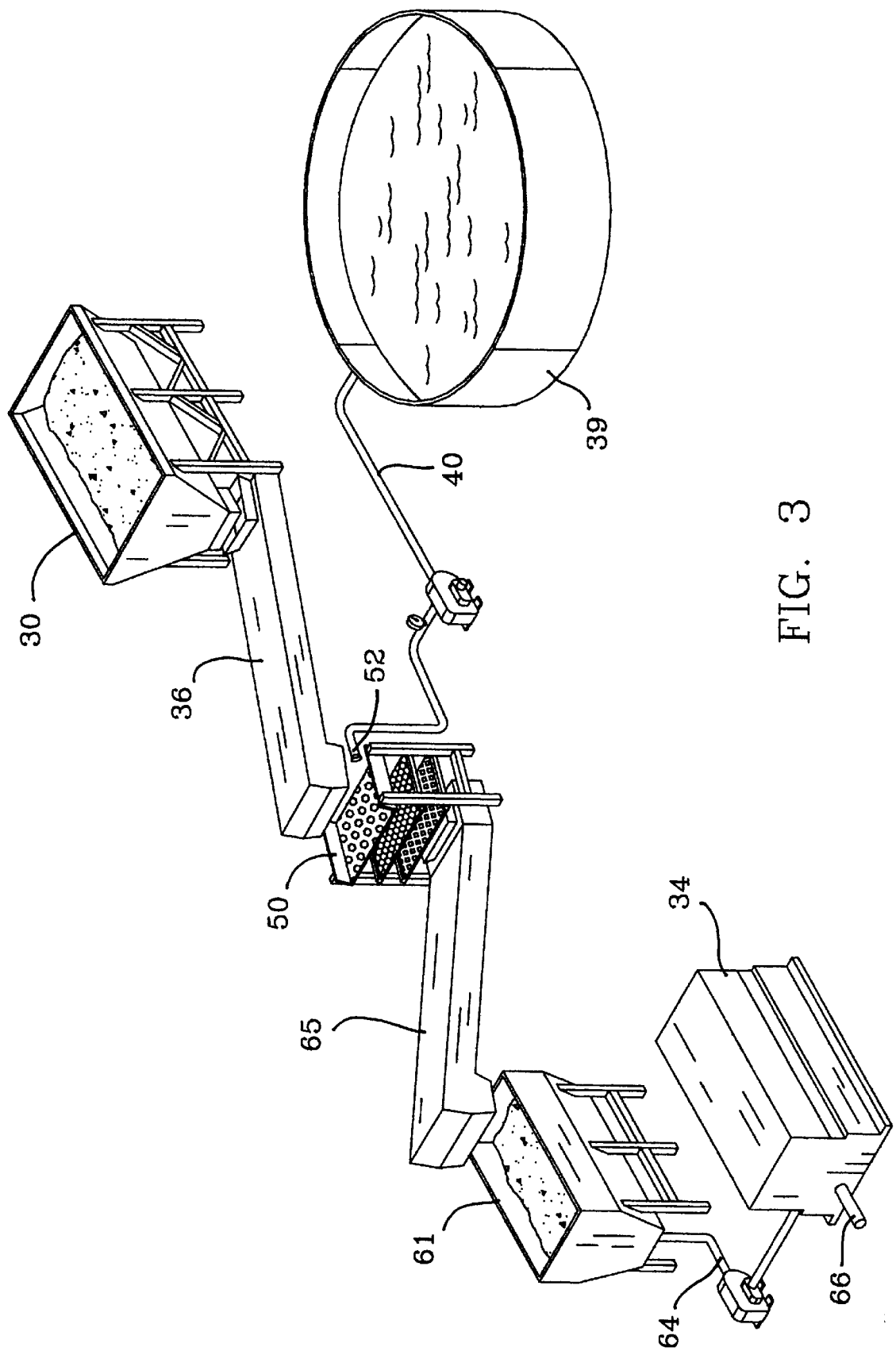
FIG. 3 is a perspective view of the components of the apparatus.

Referring to FIGS. 2 and 3, the slurry formation and injection apparatus comprises in general terms a feed hopper 30, mixing-averaging apparatus 32 and injection pump apparatus 34. A conveyor 36 transports waste material from the hopper to the mixing-averaging apparatus and comprises a rotatably-driven auger 37 housed within an elongate chamber 38. A water supply tank 39, linked by pipe 40 to the mixing-averaging apparatus, provides a steady high-pressure (approx. 200 psi) source of water for the creation of the slurry. A pipe 48 transports the slurry from the mixing-averaging apparatus to the pump 34.

The feed hopper 30 comprises waste-receiving means and is utilized for wastes that consist of oil or sludge-bearing sand, or the like. For certain other, more fluid types of wastes, the hopper may be dispensed with and the wastes deposited directly into the mixing-averaging apparatus. The hopper is designed to receive a load of between 8 and 20 cubic meters of sand.

The mixing-averaging apparatus comprises a particle sizing means to screen out oversized particles, consisting of a reciprocally-driven multilevel screen deck 50 onto which wastes are deposited from the conveyor 36. The individual screens within the deck are adjustable and removable to optimize slurry composition for particular injection conditions. A water sprayer 52 is positioned to direct a high-pressure stream of water at the wastes as they exit the conveyor 36. The sprayers are linked to the pipe 40. The screen deck is comprised of three levels of screens, each having a variable matrix size. Waste material is dumped onto the uppermost screen deck 58 either directly or from the conveyor 36. The action of the spray jet and the shaking of the screens serves to remove particles having a size greater than 0.25 to 1 cm. and foreign objects in the waste stream. These oversized particles are either crushed by a stand-alone crusher 60, to be fed back into the waste stream, or are collected and disposed of by other means, not shown. The screened wastes fall from the screen deck into a slurry averaging and mixing tank 61 that supports therein dual rotatably driven mixing screw augers 62 and 63. Additives and agents may be added directly into the tank 61, if required.

A pipe 64 leads from the base of the slurry averaging tank into the booster pump apparatus 34, which pressurizes the slurry and discharges it under pressure through a discharge pipe 66 into the well 68.

The various components of the system are driven by conventional variable speed hydraulic motors 70. These in turn are linked to a control means 72 which permits control over the inputs into the slurry-production means and over the slurry design. The control means, shown schematically in FIG. 3, receives input from a real-time monitoring system that monitors, records and visually displays the injection parameters of slurry density, injection rate, surface injection pressures, injected volumes and slurry solids concentration.

The monitoring system consists of:
slurry density measuring means 80;
pump pressure measuring means 82;
means 84 to measure water input into the system;
means 86 to measure injection rates;
a control data logger 88 linked to all of the measuring means to record and store the data in real time. A digital display 90 is provided in the data logger. The monitoring system is also linked to and receives data from the pressure gauges 7 and 10 at the well bottom and surface.

The control means is adapted to maintain an even slurry density and delivery rate and pressure. The means by which this is achieved comprise generally conventional feedback means.

The apparatus further includes a computer operatively linked to the surface uplift indicators and, optionally, to the micro seismographs described above, and programmed to assess the localization and movement of the solids embedment zone in the manner described above.

Although the present invention has been described by way of preferred embodiments, it will readily be seen by those skilled in the art to which this invention pertains that numerous departures, variations, etc. of the invention may be made, without departing from the spirit and scope of the invention, as defined in the following Claims.

We claim:

1. A method for disposing of wastes by injection within a geological stratum, comprising the steps of:
    a) selecting an appropriate generally permeable and porous target stratum, said target stratum being overlain by a layer of relatively low permeability strata;
    b) calculating the approximate total available storage volume of the target stratum, based on the approximate average thickness and area of the stratum and the average porosity of the stratum;
    c) preparing an at least partly cased injection well extending from the ground surface into said target stratum;
    d) positioning a pressure gauge within said injection well in the region of the base of said well for measuring liquid pressure within said well;
    e) perforating the casing of said injection well in the region where the well traverses said target stratum;
    f) injecting a pressurized slurry comprising waste materials suspended in a carrier liquid into said injection well in a series of discrete injection episodes separated by interinjection episodes at an injection pressure equal to or greater than the fracture or overburden pressure;
    g) measuring the well bottom pressure of the slurried wastes with said pressure gauge on a substantially continuous basis during each injection and interinjection episode with said pressure gauge;
    h) terminating said injection when the target stratum is generally fully saturated with slurried wastes, as determined by the amount of wastes injected and the calculated available storage volume;
    said method being further characterized in that the pressure and flow rate of slurry injection during each injection episode is adjusted to maintain a generally steady state pressure level at the well bottom, as measured by the pressure gauge, each injection episode terminating when the well bottom pressure climbs a predetermined amount above said steady state level and each interinjection period terminating when said pressure drops a predetermined amount below said steady state level.

2. A method as in claim 1, wherein the duration of said injection episode is further determined by means of placing one or more surface uplift indicators on the ground surface in the region around said injection well and terminating said injection episode upon measurement of a fixed amount of uplift, with the duration of said interinjection episodes being determined by assessing the time of approximate cessation of further surface uplift.

3. A method as in claim 2 wherein said surface uplift indicators comprise tiltmeters positioned within about 400 meters of said injection well.

4. A method as in claim 2, wherein said surface uplift indicators are employed to localize the region of injected solids within the target stratum, by positioning an array of said indicators in the approximate region of said target stratum and localizing the area of uplift.

5. A method as in claim 1, wherein the duration of said injection and interinjection episodes is further determined thorough the use of monitoring wells located between about 50 and 400 meters from said injection well, each of said monitoring wells having a pressure gauge in the region of the bottom thereof, said injection episodes being terminated when the pressure as measured in said monitoring wells climbs by more than about 25% of the original pressure within said wells.

6. A method as in claim 1, wherein said target stratum is selected to have a minimum average thickness of approximately 4 meters, a minimum average transmissivity of approximately 0.5 Darcy-meters, a minimum porosity of about 15% in those regions that have an average permeability above about 100 milliDarcy, and a minimum compressibility of about $1 \times 10^{-6}$ $kPa^{-1}$.

7. A method as in claim 6, wherein said target stratum is overlain by overburden strata having a minimum thickness of about 10 meters with a maximum permeability of about 10 milliDarcy.

8. A method as in claim 1, wherein said overburden strata is selected to include clays or zeolites sufficient for the absorption of toxic organic and heavy metal wastes.

9. A method as in claim 1, comprising the further step of measuring microseismic disturbances at several locations in the region of said injection well, and assessing thereby the approximate horizontal and vertical spread of the waste solids emplacement zone within said target stratum and the extent of growth of the solids emplacement zone.

10. A method as in claim 1, comprising the further step of incorporating within said slurry a cementitious agent.

11. A method as in claim 1, wherein each injection episode commences with the injection of clear carrier liquid, with the concentration of suspended wastes increasing therein over the initial 15–30 minutes of said injection episode to reach the target concentration of said suspended wastes, with said injection episode concluding with the injection of additional clear carrier liquid, with the injection well then being shut in under full injection pressure.

12. A method as in claim 1, comprising the further step of post-injection monitoring of the target stratum to assess migration of the waste solids entombed therein from the target stratum, said post-injection monitoring comprising the measurement of surface uplift in the region of the injection well, monitoring and recording said measurements on a periodic basis, and determining thereby any instability within the solids emplacement zone and the localization of the solids emplacement zone, and comparing the said localization with the localization thereof immediately following the injection process to assess any volume change in the site or movement thereof.

13. A method as in claim 12, comprising the further step of measuring microseismic disturbances in the region about said injection well to assess thereby any instability in the solids emplacement zone and the localization thereof.

14. A method for disposing of waste material by injection within a geological stratum, comprising the steps of:
    a) selecting an appropriate generally permeable and porous target stratum, said target stratum being overlain by a layer of relatively low permeability strata;
    b) calculating the approximate total available storage volume of the target stratum, based on the approximate average thickness, area and mechanical compressibility of the stratum and the storage capacity according to the formula: Storage Capacity=$dP/(dV \times dt)$
    where dP=Injection Pressure—Shut in Formation Pressure dV=Volume of Injected Material dT=duration of shut-in Period;

c) calculating the optimal injectivity for the formation according to the formula: Injectivity=Slurry Injection Rate/(Press$_{inj}$–Press$_{fmt}$) where Press$_{inj}$=injection pressure and Press$_{fmt}$=formation pressure;

d) preparing an at least partly cased injection well extending from the ground surface into said target stratum;

e) positioning a pressure gauge within said injection well in the region of the base of said well for measuring liquid pressure within said well;

f) perforating the casing of said injection well in the region where the well traverses said target stratum;

g) injecting at generally said optimal injectivity a pressurized slurry comprising said waste material suspended in a carrier liquid into said injection well in a series of discrete injection episodes at an injection pressure equal to or greater than the fracture or overburden pressure, said injection episodes separated by interinjection episodes wherein no slurry is injected and said well is shut-in;

h) measuring the well bottom pressure of the slurried wastes with said pressure gauge on a generally continuous basis during each injection and interinjection episode with said pressure gauge;

i) terminating said injection when the target stratum is generally fully saturated with slurried wastes, as determined by the amount of wastes injected and the calculated available storage volume;

said method being further characterized in that the pressure and flow rate of slurry injection during each injection episode is adjusted to maintain a generally steady state pressure level at the well bottom, as measured by the pressure gauge, each injection episode terminating when the well bottom pressure climbs a predetermined amount above said steady state level and each interinjection period terminating when said pressure drops a predetermined amount below said steady state level.

15. A method as in claim 14, comprising the further step of performing pressure fall off and step rate tests for evaluation of formation flow behavior, formation geomechanical behavior and slurry injectivity in the target formation for assessment of formation suitability for waste injection and determining a necessary approximate fracture extension rate and pressure.

16. A method as in claim 14, wherein said well casing is perforated with a perforation density of approximately 20 shots per meter, radially phased at least 90° around said casing and within a perforation interval of less than about 10 meters.

17. A method is in claim 14, wherein said target stratum is selected to lie at a depth less than about 800 meters of the surface, and surface displacement is measured in the region surrounding said injection well by means of tiltmeters positioned on the surface about said well, said method comprising the further step of analyzing the data produced by said tiltmeters to reconstruct the formation fracture behavior in terms of dip, orientation and aspect ratio of the formation fractures and deformation of the target formation, namely volumetric and shear deformation.

18. A method as in claim 14, wherein said target stratum is selected to lie at a depth greater than about 800 meters, and comprising the further step of performing microseismographic analysis of the ground region about said well, and assessing thereby the vertical and areal extend of fracture propagation resulting from said injection process.

19. A method as in claim 14, wherein the step of injecting slurry into the target stratum comprises the following steps:

a) an initial injection of clear carrier fluid at a high selected rate to initiate hydraulic fracture of the target formation;

b) gradual introduction within said carrier liquid of an increasing concentration of waste matter over the course of a first selected time interval;

c) injection of waste-bearing slurry during a second selected time interval;

d) gradual diminishment of the waste content within said slurry, to arrive at a clear carrier liquid, over the course of a third selected time interval;

e) an interinjection period during which the well is shut-in for a fourth selected time interval;

f) a repeat of steps a–e for a selected number of times, followed by a prolonged shut-in period for a fifth selected time interval greater than said fourth time interval.

20. A method as in claim 19, wherein said second selected interval is 4–14 hours and the total duration of steps a–e is approximately 24 hours.

21. A method as in claim 14, wherein said slurry is prepared according to a method wherein the concentration of slurry additives (optionally including viscosifiers, surfactants and adsorbing agent), slurry viscosity, slurry waste concentrations and slurry specific gravity are selected as a function of the following considerations:

composition of waste material including mud/sand/slop/water ratios daily slurry injection volumes produced sand grain size during injection fines/clay content during injection hydrocarbon content of the sand or viscosity of the muds and slops formation grain size and stress state formation geology heterogeneous effective stress and permeability distribution in the formation repeated loading and unloading of rock stresses wellbore cement quality wellbore completion and quality.

22. A method as in claim 14, wherein said waste material is selected from a viscous fluid, oil sludge, municipal waste water or water treatment sludge and industrial wastes.

23. A method as in claim 14, wherein said waste comprises wastes in particulate form having a grain size between 2 $\mu$m and 1000 $\mu$m and said slurry is prepared having a maximum solids concentration of about 40% by volume.

24. A method as in claim 22, wherein said slurry bearing said waste material is injected in a series of intervals alternating with intervals of injection of a slurry incorporating sand particulates.

25. A method as in claim 23, further including the steps of injecting into said well a facilitating slurry incorporating a viscous fluid prior to injection of said waste material, and a further injection of said facilitating slurry into said well when the wellbottom pressure surges above a preselected amount.

26. A method according to claim 14, wherein geomechanical and formation flow responses selected from the following are measured in said strata surrounding said injection well:

transient changes in permeability and transmissivity within the target stratum;

changes in compressibility and stress state within the target stratum;

dynamic fracture propagation within the target and overburden strata;

dynamic in situ pressure and stress gradient development;

dynamic in situ pressure and stress dissipation;

target stratum deformation and yielding;

overburden straining and bending; and asymmetric waste distribution about the injection well.

27. A method according to claim 26, wherein said selected geomechanical and formation flow measurements are used for the steps selected from the following:

documentation of waste volumes and formation response to allow for optimization and control of the SFI process;

assessment of hydraulic isolation and containment of the waste material within the target stratum;

quantitative evaluation of formation stress state, well integrity, formation containment, formation response, in situ waste distribution, formation storage capacity, or formation infectivity during the injection process;

ensuring worker safety during the injection procedures;

evaluation of target stratum mechanical and flow responses to the injection process; and determination of distribution of the injected material within the target stratum.

28. A method as claimed in claim 14, wherein said waste material injection is accompanied by one or more monitoring procedures conducted before, during and after the injection process, selected from among the following:

i) monitoring the slurry injection and emplacement by means of measurements of wellbottom hole pressure within the injection wells to assess formation pressure response to the waste injection, as well as permitting pressure fall-off tests and assessment of SFI and formation mechanics;

ii) monitoring wellbottom hole pressure within observation wells displaced from the injection wells within about 400 meters to provide assessment of formation pressure gradients, formation mechanics and flow of wastes;

iii) step rate injection tests conducted within the injection well, to assess fracture extension rate and formation pressure response, as well as closure stress gradient and waste containment within the formation;

iv) fluid level measurements within the offset monitoring wells to assess distribution of pressure gradients within the waste emplacement zone and to provide a measurement of waste containment;

v) tracer logs within the injection well, to determine the extent of hydraulic isolation of the formation and wellbore during the injection process and an assessment of fracture orientation within the target formation;

vi) monitoring of surface tiltmeter data generated in the region about the wellhead to assess the fracture orientation and azimuth, as well as permitting a reconstruction of fracture geometry, horizontal and vertical dimensions and spread of the waste body within the target formation and the rate of change of same, and deformation within the formation, as well as a further assessment of the SFI mechanics;

vii) injection parameter monitoring comprising real time recording of injection pressures at wellhead and wellbottom, casing pressure, injection rate, injection volumes and slurry density to permit a correlation of formation response with the SFI operating parameters;

viii) material sampling of the slurry conducted regularly and frequently to accommodate various local regulatory requirements.

29. A method as in claim 14, comprising the further step of incorporating within said slurry particulates comprising between approximately 50% to 95% shale chips or clays.

30. A method as in claim 29, wherein said slurry further includes low or medium level radioactive wastes.

31. A method as in claim 14, wherein said target stratum is overlain by overburden consisting of alternating relatively permeable and impermeable stratigraphy.

32. A method as in claim 31, wherein said target stratum is directly overlain and capped by a capping layer of relatively low permeability.

33. A method as in claim 32, wherein said capping layer has a minimum thickness of about 1 meter, with a maximum permeability of approximately 10 miliDarcies.

34. A method as in claim 31, wherein said overburden includes within 100 meters above said target stratum a permeable zone having an average thickness of at least about 2 meters.

35. A method as in claim 14, wherein said target stratum is selected to lie generally horizontally, to have an average thickness of at least 5 meters, an average permeability of at least about 100 miliDarcies, a minimum porosity of about 15%, and a minimum compressibility of about $1 \times 10$ kPa.

36. A method as in claim 35, wherein said target stratum is further selected to have relatively little resistance to fracture propagation.

37. A method as in claim 14, wherein the following injection conditions are selected for use with a predominantly particulate waste streams:

maximum slurry injection rate: about 1.1–2.0 times a calculated fracture extension rate daily slurry injection volume: about 700–1500 $m^3$/day waste injection volume: about 50–225 $m^3$/day av. slurry concentration: about 5–30% sand by volume av. slurry density: about 1000–1300 kg/$m^3$ max. slurry density: about 1375 kg/$m^3$ injection Pressures about 1.1 to 1.5 times a calculated fracture extension pressure injection episodes: approximately 24 hour injection/interinjection cycle, including About 4–14 hours/day injection episode injection cycle: 5 day injection cycle, 2 days shut-in or 11 day injection cycle followed by 3 day shut-in.

38. A method as in claim 14, wherein the following injection conditions are selected for use with a slurry comprising predominantly viscous liquids:

maximum slurry injection rate: about 1.1–2.0 times a calculated fracture extension rate daily slurry injection volume: about 700–1000 $m^3$/day waste injection volume: about 50–100 $m^3$/day av. slurry concentration: about 15% slop by volume av. slurry density: about 1000–1200 kg/$m^3$ max. slurry density: about 1250 kg/$m^3$ injection Pressures about 1.1 to 1.5 times a calculated fracture extension pressure injection episodes: approximately 24 hour injection/interinjection cycle, including about 4–14 hours/day injection episode injection cycle: 5 day injection cycle, 2 days shut-in.

* * * * *